June 19, 1956 B. JANSEN 2,751,551
ADJUSTABLE POWER FACTOR CORRECTION SYSTEM
Filed Oct. 8, 1952 2 Sheets-Sheet 1
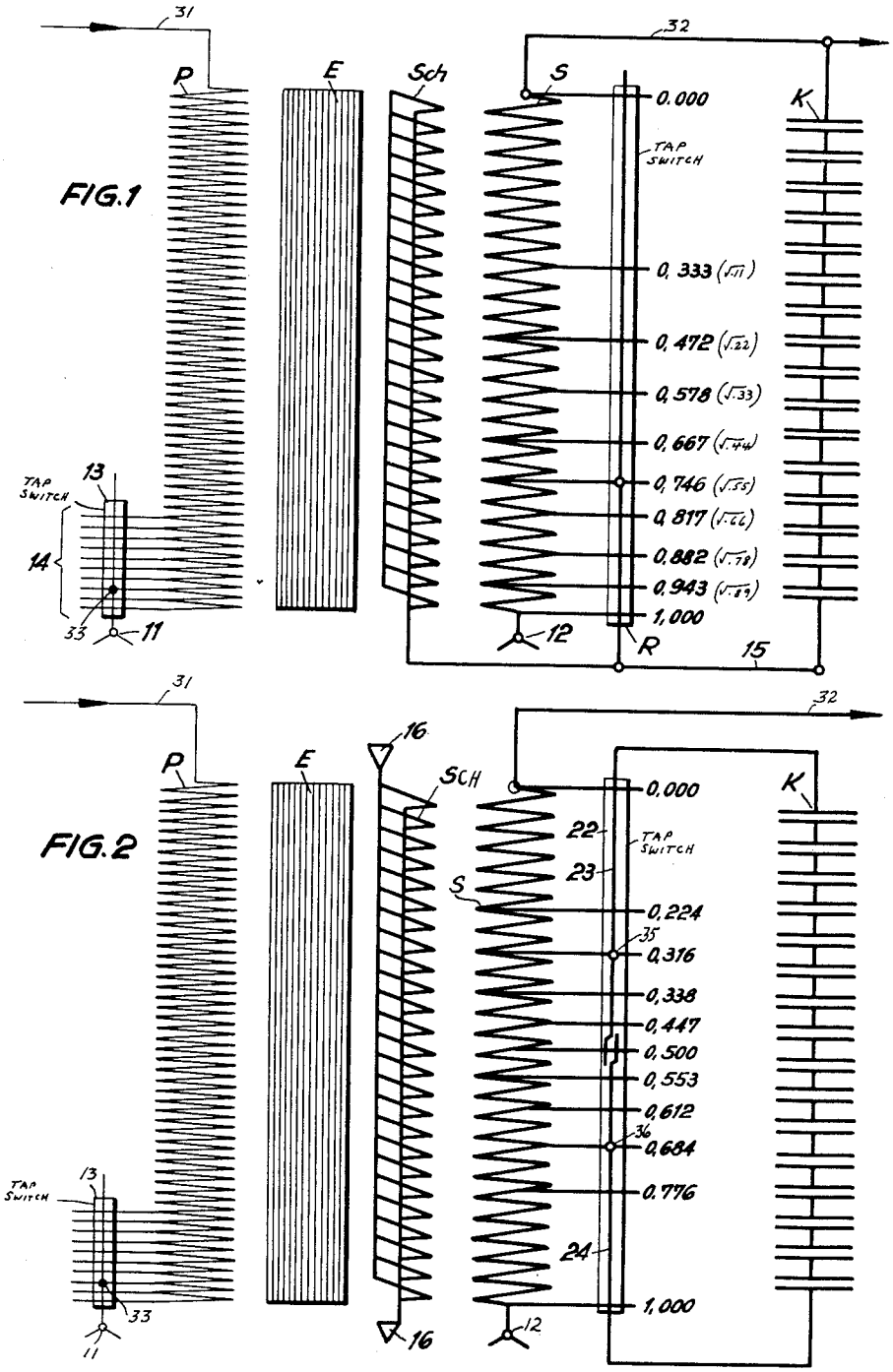
INVENTOR:
BERNHARD JANSEN
By
Richardson, David and Nardon
ATTY'S

United States Patent Office

2,751,551
Patented June 19, 1956

2,751,551
ADJUSTABLE POWER FACTOR CORRECTION SYSTEM

Bernhard Jansen, Regensburg, Germany

Application October 8, 1952, Serial No. 313,695

Claims priority, application Germany October 9, 1951

10 Claims. (Cl. 323—110)

The present invention pertains to power factor correction means for power distribution networks, and more particularly to devices of this character which utilize a common power transformer simultaneously both for changing the distribution voltage in the network and for supplying an adjustable amount of leading reactive power factor corrective current to the network.

Known power factor correction systems utilize banks of capacitors which are adjustable by means of switches selectively connecting or disconnecting the capacitors individually or in groups, the desired value of capacitance being obtained by connecting one or more of the capacitors to the power line in a combination which results in this particular value of capacitance.

Other systems employ a variable transformer or an induction regulator to vary the reactive current as the demands of the system vary during the course of the day.

Each of these present systems has its own field of application where its individual operational and economic characteristics make it particularly suitable.

There are, however, many problems in the field of adjustable power factor correction which still remain unsolved.

The present invention is applicable to those situations in which a power distribution transformer is available, and which, in addition to serving its usual purpose of changing the voltage in the distribution system, is also used concurrently for the energization of a bank of capacitors.

An object of the invention is to provide an adjustable power factor correction system in which a single bank of power factor correction capacitors of fixed capacitance is utilized.

Another object of the invention is the provision of a power factor correction system of this character in which adjustment of the reactive current is made by means of a tapped transformer and a conventional tap switch for changing taps under load.

A further object of the invention is to provide means for the equalization of any non-uniformity in the current distribution throughout the length of the transformer windings in order that the flux density in the core may have a relatively uniform value throughout its entire length.

A further object of the invention is the provision of a system of this character in which a two pole tap switch is employed and in which the taps may be symmetrically arranged with respect to a center tap.

Other and further objects will become apparent upon reading the following specification, together with the accompanying drawing forming a part hereof.

Referring to the drawing:

Fig. 1 is a schematic circuit diagram of an embodiment of the invention.

Fig. 2 is a schematic circuit diagram of a modified form of the embodiment shown in Fig. 1.

Fig. 1 shows a distribution transformer of conventional construction, comprising a primary winding P, a secondary winding S, an elongated laminated magnetic core E and an equalizing winding Sch.

Figure 3:
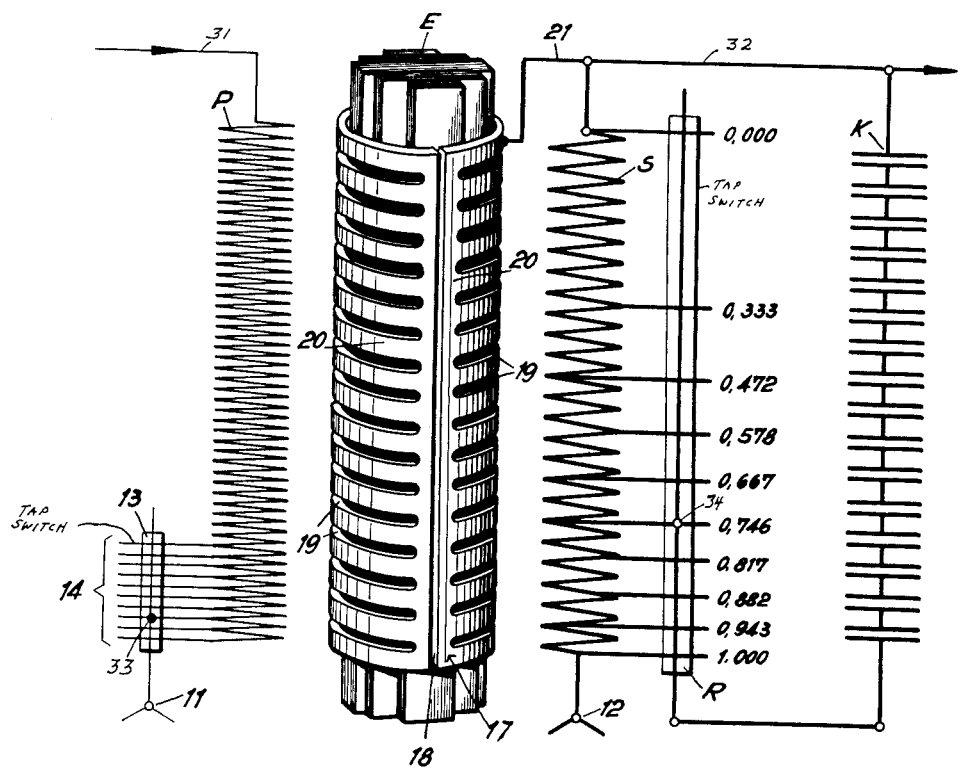
Fig. 3 is a schematic circuit diagram of a further modified form of the embodiment shown in Fig. 1.

Fig. 1 illustrates a single phase of a three phase constant voltage power distribution system, the other two primary windings (not shown) being Y-connected to the primary winding P of Fig. 1 as indicated at the neutral point 11 and the other two secondary windings being Y-connected to the secondary winding S as indicated at the neutral point 12. The power distribution network comprises a high voltage power distribution conductor 31 and a return conductor, constituted in the present example by the neutral point 11 of the Y-connected three-phase primary windings P. In the case of a single phase system or a delta-connected system, the return conductor would be a line wire. A further power distribution conductor 32 operates at a relatively lower voltage and a return conductor therefor is constituted by the neutral point 12 of the Y-connected three-phase secondary windings S.

For purposes of voltage adjustment, a tap changing switch 13 of usual construction is shown connected to the neutral point 11 of the primary side, the primary winding P being provided with a plurality of tap connections 14 connected to the tap switch 13. The tap switch 13 comprises a movable contact member 33 for selectively establishing a connection with a desired one of the primary taps.

The secondary winding S is shown provided with ten taps designated from 0.000 to 1.000 inclusive which may be selectively connected by means of a further tap changing switch R of conventional construction to a conductor 15. The tap switch R comprises a movable contact member 34 for selectively establishing a connection with a desired one of the primary taps 0.000 to 1.000. The taps .000 to 1.000 are connected to spaced points along the secondary winding S to permit a different voltage to be derived from each of the taps. There are nine taps intermediate the end taps. The tap changing switches 13 and R are suitable for changing taps under load and are of conventional construction. They may also, for example, take the form shown in my copending application Serial No. 214,280, filed March 7, 1951, now U. S. Patent No. 2,680,790, issued on June 8, 1954, for a Load Changeover Switch for Tapped Transformers Using a Combination of Contact Movements.

A bank of capacitors K serially connected to provide a fixed predetermined capacitance is shown connected between the high voltage line terminal of secondary winding S and the conductor 15 which extends to the movable contact 34 of tap changing switch R. The voltage applied to the capacitor bank K will thus depend upon the position of contact 34 of the tap changing switch R. The maximum voltage which may be applied to the capacitor bank K will be the full voltage of secondary winding S when the movable contact 34 of tap switch R is connected to tap 1.000. In the embodiment illustrated in Fig. 1, the tap switch contact 34 is shown connected to tap 0.746 which applies this decimal fraction of the full secondary voltage to the capacitor bank.

The reactive-kilovolt-amperes delivered to the system varies as the square of the voltage applied to the capacitor bank K and the voltage tap values shown in Fig. 1 have been selected to provide approximately equal steps in reactive kva. between adjacent secondary taps from zero to the maximum available at the full voltage of the secondary winding S. Obviously, any other desired tap spacing may be used, depending upon the desired number of steps between zero and maximum reactive kva. and the desired kva. spacing between steps which latter may not necessarily be uniform.

The voltage spacing between taps as illustrated in Fig. 1 of the drawing is selected to provide a change of approximately 11% of the maximum kilovolt-ampere leading power factor correction for each movement of switch contact 34 from any tap to any adjacent tap. To illustrate, the uppermost tap, 0.333 is proportional to the square of 0.11; the next tap, .472 is proportional to the square root of 0.22; tap .578 to the square root of 0.33, etc., each differing from the next by a constant difference of 0.11 or ⅑ (0.1111 . . . ) to be more precise, the secondary winding being divided into a total of nine divisions each interconnecting adjacent ones of the ten taps. In Fig. 1, the tap voltages are each proportional to the square root of an integer from 0 to 9 so that the difference between these numbers for any two adjacent taps is constant and equal to 1 for all of the taps. This dimensioning provides constant kva. correction steps between adjacent taps.

Ordinarily, the kva. spacing between taps will be uniform, and accordingly, the voltage differences between adjacent taps will vary, substantially as shown in the illustrative example of Fig. 1. In the case of a switch for changing transformer taps under load which uses switching resistors, the resistance values are preferably determined in accordance with special considerations in order that the contact duty of the switch may be uniform throughout the entire range.

As a result of connecting the capacitor bank K to different portions of the secondary winding S, the reactive current for power factor correction flows only in that portion of the winding which is connected in series with the capacitor K and not in that portion of the winding in shunt with capacitor K. In Fig. 1, the corrective leading current flows between tap 0.746 and the neutral point 12. No corrective current, however, flows between that portion of winding S included between taps 0.746 and 1.000. The currents in these two sections of the secondary winding thus differ both in magnitude and in phase angle. The distribution of magnetomotive force longitudinally along the core E will thus the non-uniform and the core material will therefore not operate at optimum efficiency throughout the entire length of the core.

This condition may be corrected by winding the secondary winding in layers, so arranged that there is an integral number of layers between adjacent taps, each layer extending throughout the entire length of the core E.

Another method of correcting this condition is the use of the equalizing winding Sch which consists of a number of coils equal in number to the coils of the secondary winding and distributed along the core at the same locations as the usual individual sectional coils of the secondary winding. The coils of the equalizing winding Sch all have equal numbers of turns and are all connected in multiple, so that any difference in flux density in the core which induces a difference in voltage per turn in the equalizing windings will build up a circulating current among the equalizing windings tending to correct and equalize any such difference in core flux density.

The equalizing windings Sch may either be arranged with an individual winding Sch for each core of the three phase transformer, or the three equalizing windings Sch may be connected together in delta or in any other desired circuit arrangement, a delta connection being indicated at 16 in Fig. 2. This interconnection has the advantage that the equalizing windings Sch also tend to equalize the flux densities in the three legs of a three phase transformer in the same manner as the usual tertiary windings frequently provided for this purpose. They may also be suitably arranged to provide a tertiary low voltage for local use, as at the transformer station itself, for example.

If the interconnected equalizing windings or their use for a tertiary voltage is dispensed with, a simple cylinder 17 of copper or other electrically conductive material may be used to provide the desired equalization as shown in Fig. 3. The cylinder 17 consists of a sheet of copper which partially circumferentially surrounds the core E. The longitudinally extending edge portions of the sheet are spaced apart at 18 so that they are electrically insulated from each other and the formation of a short-circuited turn around the core E is prevented. The sheet of which the cylinder 17 is formed is slit partially circumferentially at 19. The series of spaced parallel slits 19 reduce eddy current losses and the slits 19 may be located at the spaces between the sections or coils of the secondary winding S. The longitudinally extending edge portions 20 serve to connect the circumferential portions of the cylinder in multiple to permit the flow of the equalizing circulating currents.

The cylinder 17 may also be connected to one side of the line, as indicated at 21, thereby increasing the effective capacitance to ground of the capacitor K by reason of its proximity to the coils of the secondary winding. This also serves to drain off any voltage transients which may appear on the line and to reduce the steepness of the wavefront of such transients.

Fig. 2 illustrates a modified form of the invention in which the capacitor K is not connected either to ground or directly to either side of the line.

Capacitor K is connected to a two pole tap changing switch 22 comprising movable contacts 35 and 36, one terminal of the capacitor being connected to the upper pole 23 and the other terminal to the lower pole 24.

The secondary winding S is provided with pairs of voltage taps which are symmetrical with respect to the midpoint tap .500. When both contacts 35 and 36 of poles 23 and 24 are on the center tap .500 the capacitor K is short-circuited and no reactive current is delivered to the system. The reactive power is increased by moving contact 35 toward tap .000 and by moving contact 36 toward tap 1.000.

In Fig. 2, if desired, the taps may be so arranged as to obtain twice the number of steps as with Fig. 1 by moving the contacts 35 and 36 individually, or the contacts 35 and 36 may operate simultaneously, being mechanically interconnected to operate together. In the latter arrangement, and using the maximum permissible voltage difference between taps, which occurs between .000 and 0.224 at one end of the secondary winding and between 0.776 and 1.000 at the other end, secondary windings of double operating voltage may be used. The simpler arrangement of Fig. 1 is generally suitable for use with 20,000 volt networks, whereas the two pole arrangement of Fig. 2 is more suitable for 40,000 volt networks.

I claim:

1. In a power factor correction system, in combination with a constant voltage power distribution network comprising at least one high voltage power distribution conductor, a return conductor for said high voltage conductor, at least one further power distribution conductor operating at a relatively lower voltage, a lower voltage return conductor for said lower voltage distribution conductor, and a power distribution transformer having a primary winding connected to said high voltage distribution conductor and said high voltage return conductor and a secondary winding connected to said lower voltage conductor and said lower voltage return conductor, the provision of: a plurality of taps connected to spaced points along said secondary winding; a multi-position tap switch connected to said taps for selectively establishing a connection with a desired one of said taps; and a power factor correction capacitor of fixed capacitance connected to said distribution network through said secondary winding by means of a circuit comprising said tap switch and said desired tap.

2. The combination according to claim 1, in which said transformer further comprises an elongated magnetizable core defining flux paths linking said primary and secondary windings and wherein, with said tap switch in certain positions thereof, the flux distribution longitudinally along said core becomes non-uniform, said combination further comprising the provision of a flux distribution equalizing winding extending along said core, said equalizing winding consisting of a plurality of sections uniformly longitudinally spaced along said core and each linking said core to the same extent, all of said sections being connected in multiple.

3. The combination according to claim 2, wherein said equalizing winding is connected to said distribution system together with said capacitor for increasing the effective capacitance of said capacitor.

4. The combination according to claim 2, wherein said equalizing winding is distributed along said core in accordance with the distribution of said secondary winding therealong.

5. The combination according to claim 4, wherein said secondary consists of a plurality of sections longitudinally distributed along said core and in which said equalizing winding consists of a plurality of sections equal in number to said secondary winding sections, all of said equalizing winding sections having the same number of turns and being connected in multiple.

6. The combination according to claim 1, in which said transformer further comprises an elongated magnetizable core defining flux paths magnetically linking said primary and secondary windings and wherein, with said tap switch in certain positions thereof, the flux distribution longitudinally along said core becomes non-uniform, said combination further comprising the provision of a flux distribution equalizing sheet of electrically conductive material at least partially circumferentially surrounding said core longitudinally thereof along with said secondary winding, the edge portions of said sheet which extend longitudinally of said core being insulated from each other to prevent the formation of a short-circuited turn around said core.

7. The combination according to claim 6, wherein said sheet has slits formed therein extending circumferentially with respect to said core for reducing the flow of eddy currents in said sheet.

8. The combination according to claim 6, wherein said sheet is connected to said distribution system together with said capacitor for increasing the effective capacitance of said capacitor.

9. In a power factor correction system, in combination with a constant voltage power distribution network comprising at least one high voltage power distribution conductor, a return conductor for said high voltage conductor, at least one further power distribution conductor operating at a relatively lower voltage, a lower voltage return conductor for said lower voltage distribution conductor, and a power distribution transformer having a primary winding connected to said high voltage distribution conductor and said high voltage return conductor and a secondary winding connected to said lower voltage conductor and said lower voltage return conductor, the provision of: a plurality of taps connected to spaced points along said secondary winding, said taps being spaced to derive a different voltage between each of said taps and one of said lower voltage conductors, each voltage being proportional to the square root of a different predetermined number, the difference between said numbers for any two adjacent ones of said taps being constant for all of said taps for providing uniform power factor corrective volt-ampere steps between adjacent ones of said taps; a multi-position tap switch connected to said taps for selectively establishing a connection with a desired one of said taps; and a power correction capacitor of fixed capacitance connected to one of said lower voltage conductors and to said desired tap through said switch.

10. In a power factor correction system, in combination with a constant voltage power distribution network comprising at least one high voltage power distribution conductor, a return conductor for said high voltage conductor, at least one further power distribution conductor operating at a relatively lower voltage, a lower voltage return conductor for said lower voltage distribution conductor, and a power distribution transformer having a primary winding connected to said high voltage distribution conductor and said high voltage return conductor and a secondary winding connected to said lower voltage conductor and said lower voltage return conductor, the provision of: a plurality of taps connected to said secondary winding at spaced pairs of points therealong disposed symmetrically with respect to the midpoint of said winding, said taps being spaced to derive a different voltage between each of said pairs of taps each voltage being proportional to the square root of a different number, the difference between said numbers for any two taps connected to adjacent pairs of points on said secondary winding being constant for all of said pairs for providing uniform power factor corrective volt-ampere steps between adjacent pairs of taps; a two pole multi-position tap switch symmetrically connected to said taps with respect to said midpoint for selectively establishing a connection with a desired pair of said taps; and a power factor correction capacitor of fixed capacitance connected to said desired pair of taps through said two poles of said switch.

References Cited in the file of this patent
UNITED STATES PATENTS

| | | |
|---|---|---|
| 832,852 | Fairfax | Oct. 9, 1906 |
| 2,325,936 | Blume | Aug. 3, 1943 |
| 2,374,050 | Palley | Apr. 17, 1945 |
| 2,549,405 | Alexanderson et al. | Apr. 17, 1951 |
| 2,595,869 | Minneci | May 6, 1952 |